UNITED STATES PATENT OFFICE.

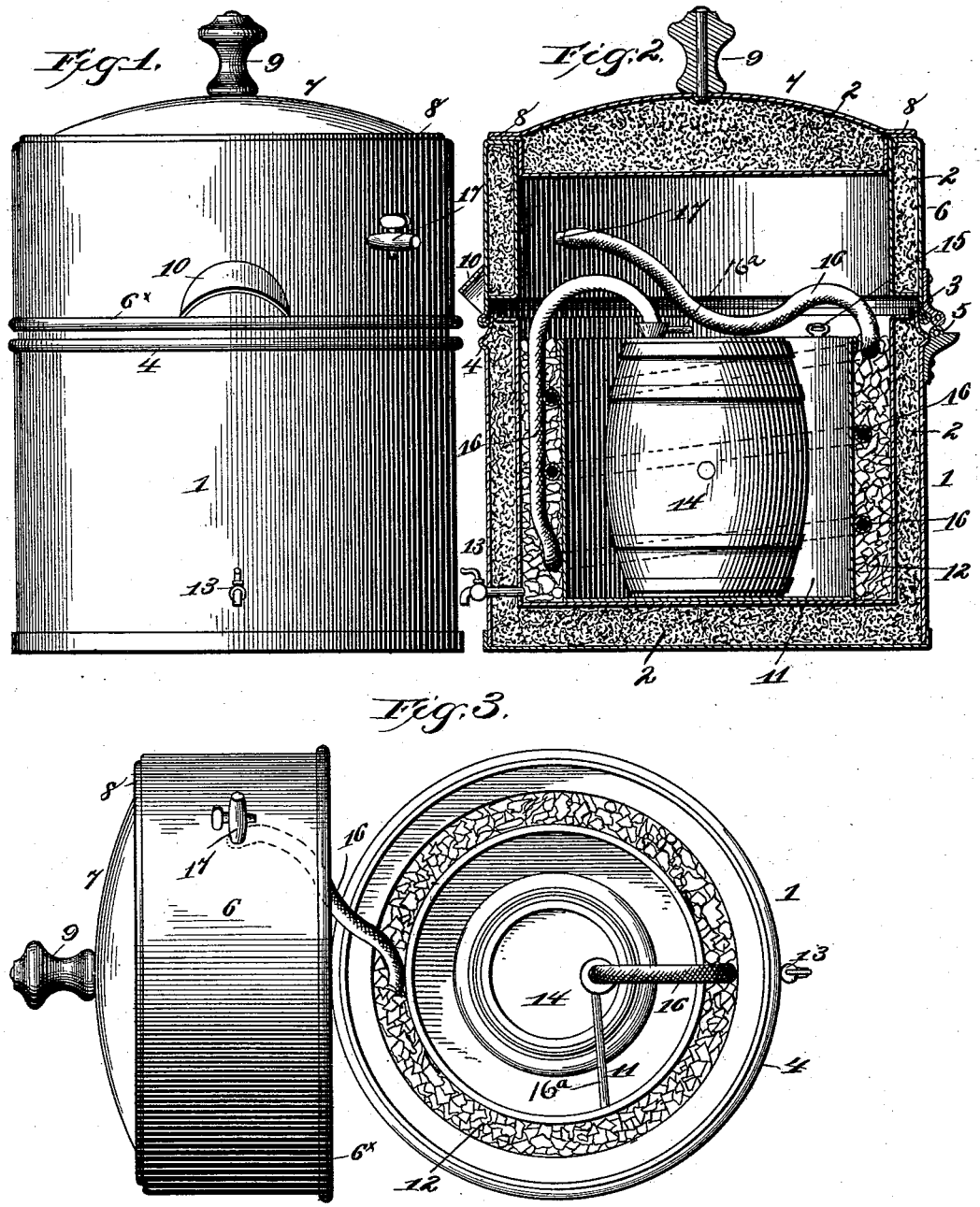

WYATT GIBSON, OF DODD, TEXAS, ASSIGNOR OF ONE-HALF TO JAMES F. SADLER, OF SAME PLACE.

BEER-COOLER.

SPECIFICATION forming part of Letters Patent No. 488,144, dated December 13, 1892.

Application filed December 22, 1891. Serial No. 415,916. (No model.)

*To all whom it may concern:*

Be it known that I, WYATT GIBSON, a citizen of the United States, residing at Dodd, in the county of Fannin and State of Texas, have invented a new and useful Beer-Cooler, of which the following is a specification.

This invention relates to improvements in beer-coolers, the objects in view being to provide a cheaply-constructed and simple cooling device for cooling beer or other liquids, to so arrange the parts as to permit of an easy handling of the keg containing the beer or other liquid, to permit of ready access to and separation of the parts for the purpose of cleaning the apparatus, and, furthermore, to adapt the same when not in use as a beer or other liquid cooler to serve as an efficient refrigerator or cold-storage chamber for domestic purposes.

With these main objects in view the invention consists in certain novel features of construction hereinafter specified, and particularly pointed out in the claims.

Referring to the drawings, Figure 1 is a side elevation of a beer-cooler constructed in accordance with my invention. Fig. 2 is a vertical section of the same, a keg of beer being shown in position within the apparatus. Fig. 3 is a top plan view, the cover being swung back to expose the interior of the apparatus.

Like numerals of reference indicate like parts in all the figures of the drawings.

In practicing my invention I employ a cylindrical double jacket or casing-section 1, between the inner and outer walls of which there is located a filling of non-conducting material 2, the upper end of the inner wall being flared and joined with that of the outer wall, as shown at 3. The outer wall below its upper edge is provided with an annular bead 4 and at one side has secured thereto one member of a hinge 5.

6 designates an upper cylindrical casing-section, between the double walls of which a packing, as 2, is located. The upper and lower edges of the two walls composing the upper section of the casing 6 are joined, while the outer wall at its lower edge is adapted to fit over the outer wall of the lower section or cylinder 1, and being beaded, as at 6×, will rest upon the bead 4 of the section 1.

7 designates a circular lid consisting of an inner and outer wall and an intermediate packing 2. The lid is designed to fit removably in the upper section 6 of the casing and is provided with an annular surrounding flange 8, which overlaps the upper edge of the cover 6. The lid is further provided with a suitable handle or knob 9, by which the lid may be removed conveniently from the upper section of the casing when desired. The upper section of the casing is removable from the lower section and has secured to its external wall the upper member of the before-mentioned hinge 5. Diametrically opposite this point a convenient hand-hold 10 is secured to the external wall of the upper section.

Seated removably in the lower section 1 of the casing is a cylinder or tank 11, the diameter of which is somewhat less than the internal diameter of said section and combines with the latter to form an intermediate annular refrigerating-space 12. The upper end of the tank 11 occurs below the upper end of the lower section, as shown, and for a purpose hereinafter specified. A draw-off cock or faucet 13 passes through the two walls and packing of the lower section of the casing and communicates at its inner end with the annular refrigerative space 12.

In operation as a cooler for beer or other liquids the keg or cask 14 is first placed in the tank 11, and the latter, being provided with the bails or handles 15, may be readily lifted and placed within the lower section 1, and to facilitate the insertion of the tank and keg within the casing the cover 6 is swung rearwardly upon its hinge, as shown in Fig. 3.

16 designates a pipe or tube, one end of which is let into the head of the keg, beyond which the pipe or tube depends to the bottom of the refrigerative space 12, and from thence is coiled about the tank 11 within said space, and finally emerges from the same and is connected with an ordinary beer-faucet 17, which is mounted in the wall of the section 6.

I prefer to employ rubber pipe or tubing, its flexibility being advantageous for certain purposes, as will hereinafter appear—namely, that it permits of an opening or swinging upwardly of the section for the purpose of giving access to the interior of the apparatus;

but, if desired, the pipe may be either wholly or partially of metal. Previous to closing the cover the refrigerative space 12 is completely filled with crushed ice, and through this body of crushed ice the beer or other liquid drawn from the keg must circulate the number of times the pipe encircles the tank, and hence, as will be obvious, is thoroughly cooled before it reaches the point of dispensation. An apparatus of this construction will be found especially desirable where large refrigerators or cooling-chests are not required or would be inconvenient, in that this may be readily handled and located at any point desired and as readily moved about from one place to another. At the same time it is of cheap construction, very simple, and its cost of maintenance is very slight, in that I utilize to the fullest degree the small quantity of ice required.

If desired to employ the apparatus as an ordinary domestic refrigerator, it is simply necessary to swing the upper section to one side, removing the same, if preferred, by withdrawing the pintle of the hinge and employing the lid 7 to cover the lower section. When thus used, of course, the keg, together with the coil of pipe, is removed, and the waste water from the ice may be readily drawn off through the cock or faucet 13 and utilized for different purposes.

By constructing the lower section of the casing but slightly higher than the keg and providing the tank with the handles or bails 15 it will be seen that the removal of the keg and the tank is greatly facilitated, in that the keg must be lifted in order to accomplish the same but little more than its own height, and so it is when utilized as a refrigerator for the purpose of cooling butter and other perishables, as the same facility of handling is always present.

It will be understood that any ordinary means may be employed for forcing the beer from the keg. In this instance I have shown a pipe 16ª leading from any ordinary pump.

Having described my invention, what I claim is—

1. In a cooler of the class described, the combination, with a lower casing-section and the upper casing-section hinged to the same and provided with a faucet extending therethrough, of a tank mounted in the lower casing-section, and a pipe connected to the faucet, coiled about the tank, and adapted at its inner end for connection with a keg, substantially as specified.

2. In a cooler of the class described, the combination, with a lower casing-section and the upper casing-section hinged to the same and provided with a faucet extending therethrough, of a tank mounted in the lower casing-section, and a flexible pipe connected to the faucet, coiled about the tank, and adapted at its inner end for connection with a keg, substantially as specified.

3. In a cooler of the class described, the combination, with a lower casing-section and the upper casing-section mounted thereon and provided with a draw-off faucet extending through the wall thereof, of a tank provided with handles or bails and removably mounted in the lower casing-section and of a diameter less than the same and combining therewith to form an ice-space, and a coiled pipe arranged about the tank within the space and having one end connected with the faucet and the other adapted for connection with a keg, substantially as specified.

4. In a cooler of the class described, the combination, with the lower cylindrical section-casing and the upper cylindrical casing-section hinged removably thereto, of the lid removably mounted on the upper section and adapted to fit the lower section, and a tank less in diameter than the lower casing-section and removably mounted therein and combining with the same to form an annular ice-space, substantially as specified.

5. In a cooler of the class described, the combination, with the double-walled lower casing-section, the upper casing-section similarly constructed and mounted on the same, and an internal tank located in the casing and combining therewith to form an annular ice-space, of a faucet extending through the wall of the casing and into said ice-space, substantially as specified.

In testimony that I claim the foregoing as my own I have hereto affixed my signature in the presence of two witnesses.

WYATT GIBSON.

Witnesses:
M. ROLATER,
W. N. SADLER.